March 16, 1965 T. N. SHOCKEY 3,173,469
FUEL TANK

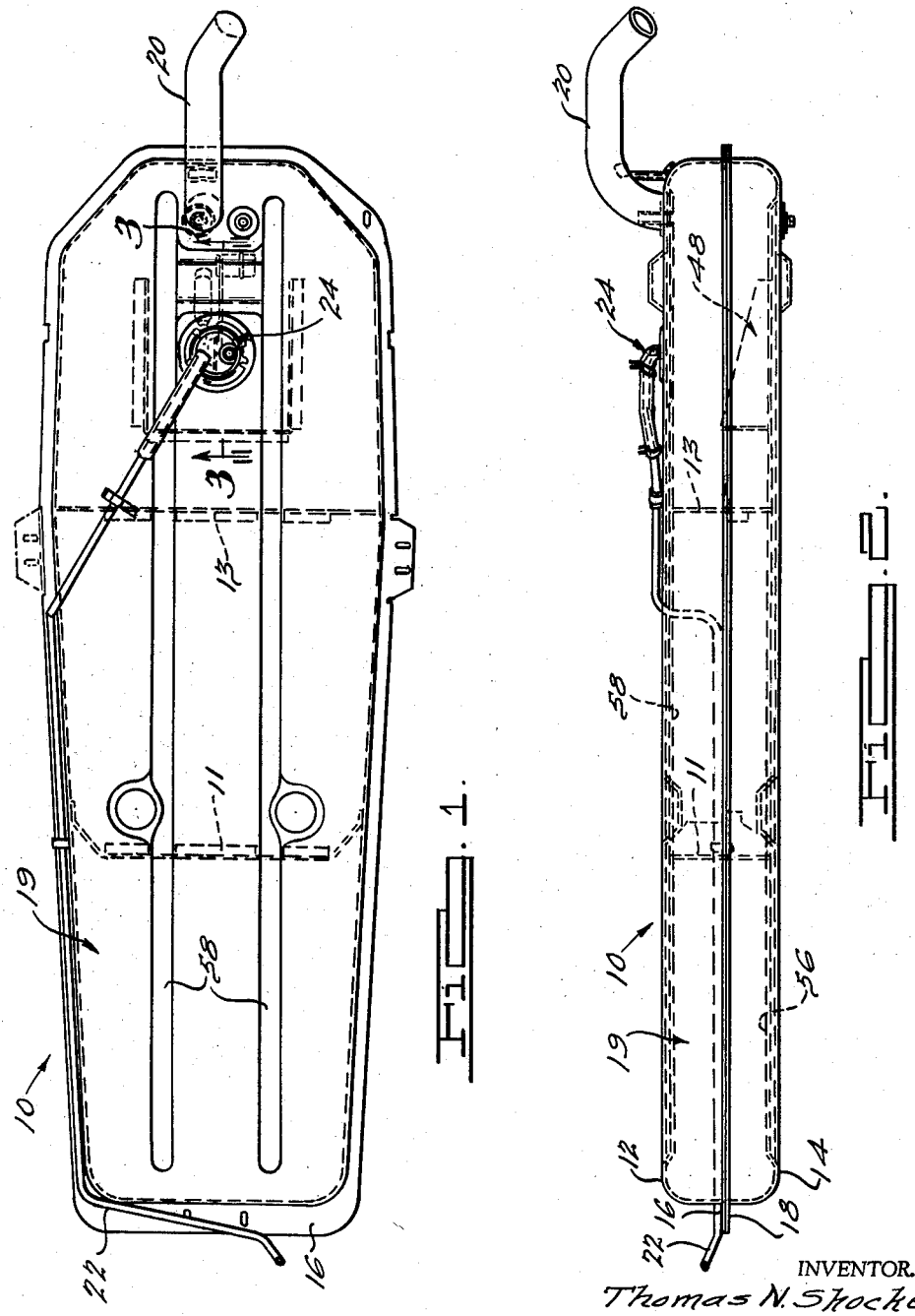

Filed Aug. 28, 1962 2 Sheets-Sheet 2

INVENTOR.
Thomas N. Shockey.
BY
Harness, Dickey & Pierce
ATTORNEYS.

3,173,469
FUEL TANK

Thomas N. Shockey, Bedford Township, Monroe County, Mich., assignor to Kaiser Jeep Corporation, a corporation of Nevada
Filed Aug. 28, 1962, Ser. No. 219,850
1 Claim. (Cl. 158—46)

This invention relates to fuel tanks and more specifically to fuel tanks for use on automotive vehicles.

While the subject invention is depicted and described as embodied in a fuel tank which is considerably elongated, having a longitudinal dimension considerably greater than its transverse dimension, and being of a relatively shallow depth, it should be understood that this invention can be readily utilized in fuel tanks having a different construction.

With a fuel tank having a relatively shallow depth and being of an elongated construction, a relatively large quantity of fuel can be deposited in a relatively thin layer over the bottom surface of the tank when the fuel level in the tank is low. If the elongated tank is tilted in such a condition, the fuel will be moved towards one end of the tank leaving the other end empty. If the fuel intake for the fuel system of the vehicle is located at the empty end, then the engine could no longer be supplied with the necessary fuel to keep it operating. Such a condition could occur if the vehicle were moving or parked along an incline. To eliminate the possibility of such an occurrence, the fuel tank would have to be always maintained at a level above the critical low level and hence for all practical purposes would reduce the effective capacity of the fuel tank.

It is an object of this invention then to provide an improved fuel tank whereby fuel is maintained available for the fuel system with the tank at a low fuel level and with the vehicle moving or parked along an incline.

It is another object of this invention to provide for an automotive vehicle a fuel tank having an elongated construction in one dimension in which fuel is made available to the fuel system with the tank at a low fuel level and with the vehicle being moved or parked along an incline. It is an object of this invention to provide a fuel tank for an automotive vehicle in which the usable capacity of the tank, considering various driving conditions of the vehicle, is increased.

Other objects, features, and advantages of the present invention will become apparent from the subsequent description and the appended claim, taken in conjunction with the accompanying drawings, in which:

FIGURE 1 is a plan view depicting a fuel tank embodying the features of this invention;

FIGURE 2 is a side elevational view of the fuel tank of FIGURE 1;

Figure 3:
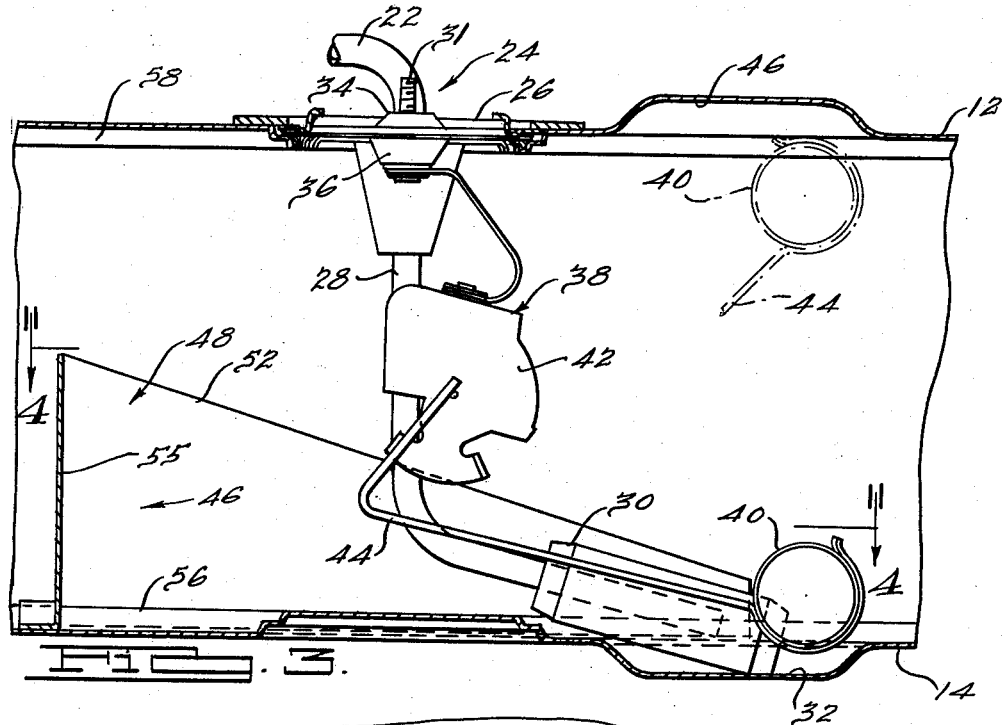
Figure 4:
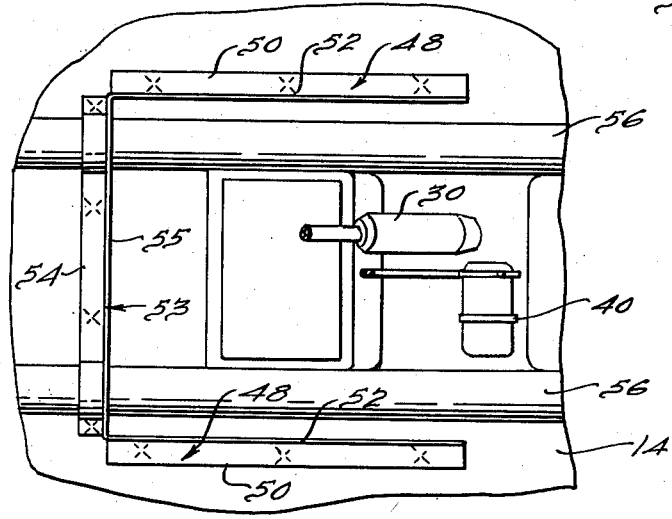

FIGURE 3 is a blownup fragmentary view with some parts shown in section of a portion of the fuel tank as shown in FIGURES 1 and 2; and FIGURE 4 is a blownup fragmentary view of the fuel tank as shown in FIGURES 1 and 2, taken substantially along the line 4—4 in FIGURE 3.

Looking now to FIGURES 1 and 2, a fuel tank assembly 10 has an enclosed tank 19 composed of substantially identical upper and lower half shell members 12 and 14, respectively, each having an outwardly extending flange 16 and 18, respectively, extending about its periphery. The flanges 16 and 18 are located in matable abutment and the two halves 12 and 14 are welded together there to form the enclosed container or tank 19. A pair of baffle plate assemblies 11 and 13, of a conventional construction, extend transversely across the fuel tank 19 and are utilized to minimize the amount of fore and aft movement of the fuel within the tank 19.

The upper and lower halves 12 and 14, respectively, are generally elongated having a longitudinal dimension substantially greater than the dimension taken transversely thereof. A filler pipe 20 is secured at one end of the upper shell 12 and is in fluid communication with the closed tank 19. In mounting the fuel tank assembly 10 to the vehicle (not shown), the tank 19 is located such that the filler pipe 20 faces the rear of the vehicle.

A fuel line 22 is a portion of the fuel system of the vehicle and has one end connected to the fuel pump (not shown) of the vehicle and has its other end connected to a fuel intake assembly generally indicated by the numeral 24 which is disposed at the same end of the fuel tank 19 as the filler tube 20 and in the area of the tank which is less than one-third of the longitudinal dimension from the one end. The fuel intake assembly 24 has a cap or plug 26 which is secured in the top of the upper shell 12 and which has a connecting tube 28 which extends into the tank 19 and is connected at one end to the plug 26 in fluid communication with the fuel line 22. At the other end of the connecting line 28 is an intake fuel filter 30 which is disposed proximate the bottom of the lower shell 14 and extends partially into a depression 32 in the lower shell 14. Thus, as the fuel pump (not shown) is actuated, a vacuum is created in the fuel line 22 and the connecting line 28 such that fuel from the bottom of the tank 19 is drawn through the filter 30 and fed to the engine (not shown) of the vehicle.

An electrical terminal 31 extends outwardly from inside of the tank 19 through the plug 26 and is electrically insulated therefrom by means of a pair of insulators 34 and 36. Electrically connected to the terminal 31 is a fuel indicating assembly 38 which can be of a conventional construction well known in the art and includes a float 40 which is pivotally secured to a body 42 by means of an L-shaped lever arm 44. The float 40 in its lowermost position is located in the vicinity of the depression 32 in the lower shell 14 such that when the fuel in the tank 19 is at an extremely low level, the float 40 can still give an indication of fuel level without engaging the bottom shell member 14. An upwardly extending depression 46 is formed in the top of the upper shell member 12 such that the float 40 in its uppermost position (i.e. indicated in dotted lines), will not contact the top of the upper shell member 12. The float 40 is connected to an electrical transducer (not shown) such that as it pivots relative to the body 42, a change in electrical characteristic (i.e. resistance, etc.), is caused to appear at the electrical terminal 31; this change in electrical characteristic can be used to provide a visual indication of the fuel level to the operator via a fuel gauge (not shown).

Note that the intake filter 30 is located proximate the rear end of the tank 19 which in turn faces rearwardly of the vehicle. Thus, if the vehicle were moving downhill or parked on an incline with its front end facing the bottom of the incline, the fuel in the tank would move toward the front of the tank 19. With the fuel at a low level and with the tank 19 inclined in such a direction for some period of time, a situation could occur in which no fuel would be available in the region of the filter 30. Of course, if the vehicle, and hence the fuel tank 19, were inclined in an opposite direction, this problem would not occur, since the fuel would then be located at that end of the tank 19. Thus, with a tank of elongated construction, as depicted by tank 19, a considerable amount of fuel could be remaining in the tank and under certain conditions be inaccessible to the fuel intake assembly 24.

In order to allow fuel to be available to the fuel system under any conditions of vehicle operation with a small quantity of fuel in the tank 19, an enclosure or pocket 46 having a rearward facing opening is located at the bottom of the lower shell 14 in the vicinity of the fuel intake filter 30. The enclosure 46 has a pair of plate members 48 which are welded or otherwise secured to the bottom of the lower shell 14 along transversely extending flange portions 50; each plate 48 has an upwardly extending rearwardly, downwardly tapering vertical wall portion 52. The plates 48 are joined together along the forward ends of their wall portions 52 by a transversely extending intermediate wall portion 55 of an intermediate plate 53 which is, in turn, welded or secured to the bottom of the lower shell 14 along a transverse flange portion 54. Formed in the bottom surface of the lower shell 14 are a pair of longitudinally and upwardly extending ribs 56 which add rigidity to the structure; likewise, a similar pair of ribs 58 are formed in the upper surface of the upper shell member 12. The intermediate plate 53 is contoured along its bottom edge to fit matably around the ribs 56 and to fit snugly against the bottom surface of the lower shell 14 to thereby provide an enclosure 46 which is capable of retaining fuel when the tank 19 is tilted with its front end down.

Thus, assuming now that the level of fuel within the tank 19 is low and that the vehicle is either parked or being driven down an inclined surface, as the fuel in the tank 19 moves to the front some fuel will be caught and trapped within the enclosure 46 thereby maintaining a supply of fuel for the intake fuel filter 30 allowing the engine to be maintained operative. Even if the vehicle is driven down an incline for a considerable period, any irregular movement of the vehicle, such as caused by braking, etc., will cause the fuel to slosh around in tank 19 thereby causing more fuel to be trapped within the enclosure 46.

It can be readily appreciated that if the fuel intake assembly 24 were located at the front of the fuel tank 19, then the enclosure 46 would have to be altered to open in the opposite direction. In other words, the enclosure 46 should open towards that end of the tank 19 at which the fuel intake assembly 24 and hence the enclosure 46 is located. The invention previously described is especially useful where the fuel tank by necessity must be made shallow and then elongated in order to provide the required capacity. Thus a fuel tank construction has been shown in which the quantity of fuel in the fuel tank can reach a low level and fuel can still be made available for the operation of the vehicle.

While it will be apparent that the preferred embodiment of the invention disclosed is well calculated to fulfill the objects above stated, it will be appreciated that the invention is susceptible to modification, variation and change without departing from the proper scope or fair meaning of the subjoined claim.

What is claimed is:

A fuel tank assembly for an automotive vehicle comprising an elongated fuel tank having a bottom portion and upwardly extending side wall portions and adapted to be mounted to the vehicle to extend longitudinally thereof, said fuel tank being of a shallow depth and having a longitudinal dimension substantially greater than its transverse dimension, fuel intake means located within said fuel tank and having an intake member located proximate said bottom portion and partially within a depression therein and near one end of said fuel tank, enclosure means substantially enclosing said intake member and said depression on three sides only, said enclosure means comprising a pair of longitudinally and upwardly extending side plates secured to said bottom portion of said fuel tank and located between and spaced from said side wall portions and located on opposite sides of said fuel intake member, said side plates joined together at their ends facing oppositely from said one end of said fuel tank by a transversely and a substantially vertically extending intermediate plate secured to said bottom portion of said fuel tank and located less than one-third of said longitudinal dimension from said one end, said side plates and intermediate plate defining an opening facing said one end and extending upwardly, unobstructedly from said bottom portion.

References Cited by the Examiner

UNITED STATES PATENTS

| | | | |
|---|---|---|---|
| 2,767,736 | 10/56 | Lackinger | 137—590 X |
| 3,031,011 | 4/62 | Dawson et al. | 158—46.5 |
| 3,049,171 | 8/62 | Neuerburg et al. | 158—46 |

OTHER REFERENCES

Mahler et al., German Printed Application, S.N. 1,099,794, 2/61.

Merkel et al., German Printed Application, S.N. 1,106,621, 5/61.

JAMES W. WESTHAVER, *Primary Examiner.*

FREDERICK KETTERER, PERCY L. PATRICK,
*Examiners.*